(12) United States Patent
Valli

(10) Patent No.: US 7,251,278 B1
(45) Date of Patent: Jul. 31, 2007

(54) PROCEDURE AND SYSTEM FOR PERFORMING MOTION ESTIMATION

(76) Inventor: Seppo Valli, VTT Tietotekniikka, P.O. Box 1203, Espoo, Finland (FI) 02044

( * ) Notice: Subject to any disclaimer, the term of this patent is extended or adjusted under 35 U.S.C. 154(b) by 595 days.

(21) Appl. No.: 10/019,922

(22) PCT Filed: Jun. 28, 2000

(86) PCT No.: PCT/FI00/00586

§ 371 (c)(1),
(2), (4) Date: Apr. 30, 2002

(87) PCT Pub. No.: WO01/01692

PCT Pub. Date: Jan. 4, 2001

(30) Foreign Application Priority Data

Jun. 28, 1999 (FI) .................................... 991469

(51) Int. Cl.
*H04B 1/66* (2006.01)
(52) U.S. Cl. .................... 375/240.12; 375/240.16; 375/240.17; 375/240.14; 375/240.15; 375/240.24; 348/699; 382/238; 382/236; 707/101; 707/104.1
(58) Field of Classification Search ........... 375/240.12, 375/240.13–240.16, 240.24, 240.17; 348/699; 707/104.1, 101; 382/238, 236; *H04N 7/12*
See application file for complete search history.

(56) References Cited

U.S. PATENT DOCUMENTS

| | | | |
|---|---|---|---|
| 5,598,216 A * | 1/1997 | Lee | 375/240.16 |
| 5,633,678 A * | 5/1997 | Parulski et al. | 348/231.5 |
| 5,694,487 A * | 12/1997 | Lee | 382/201 |
| 5,751,362 A * | 5/1998 | Lee | 375/240.16 |
| 5,768,629 A | 6/1998 | Wise et al. | |
| 6,061,401 A * | 5/2000 | Jung | 375/240 |
| 6,618,507 B1 * | 9/2003 | Divakaran et al. | 382/236 |
| 2003/0131019 A1 * | 7/2003 | Kobayashi et al. | 707/104.1 |

FOREIGN PATENT DOCUMENTS

EP       0 964 583       12/1999

OTHER PUBLICATIONS

S.T. Valli "Very low bitrate coding using hierarchical classified VQ and cluster based segmentation of motion information" Paper No. 7.3, VTT Telecommunications.
Hsieh et al. "Fast search algorithms for vector quantization of images using multiple triangle inequalities and wavelet transform" IEEE Transactions on Image Processing, vol. 9, No. 3, Mar. 2000, pp. 321-327.
Li et al. "Image sequence coding at very low bitrates: A review" IEEE Transactions on Image Processing, vol. 3, No. 5, Sep. 1994, pp. 589-609.
G. Poggi "Fast algorithm for full-search VQ encoding" Electronics Letters, vol. 29, No. 12, Jun. 1993, pp. 1141-1142.
Huang et al. "Fast full search equivalent encoding algorithms for image compressing using vector quantization" IEEE Transactions on Image Processing, vol. 19, No. 3, Jul. 1992, pp. 413-416.

* cited by examiner

*Primary Examiner*—Shawn S. An
(74) *Attorney, Agent, or Firm*—Merchant & Gould P.C.

(57) ABSTRACT

A method and system for performing motion estimation in video image compression is provided. In the method and system, an associative memory device is used in motion estimation, and the group of the image blocks to be processed is restricted on the basis of a mean error and the best match is searched among the image blocks using the PDE method. The method and system can perform motion estimation via software in a regular PC environment and still more efficiently than before.

5 Claims, 1 Drawing Sheet

PROCEDURE AND SYSTEM FOR PERFORMING MOTION ESTIMATION

FIELD OF THE INVENTION

Figure 1:
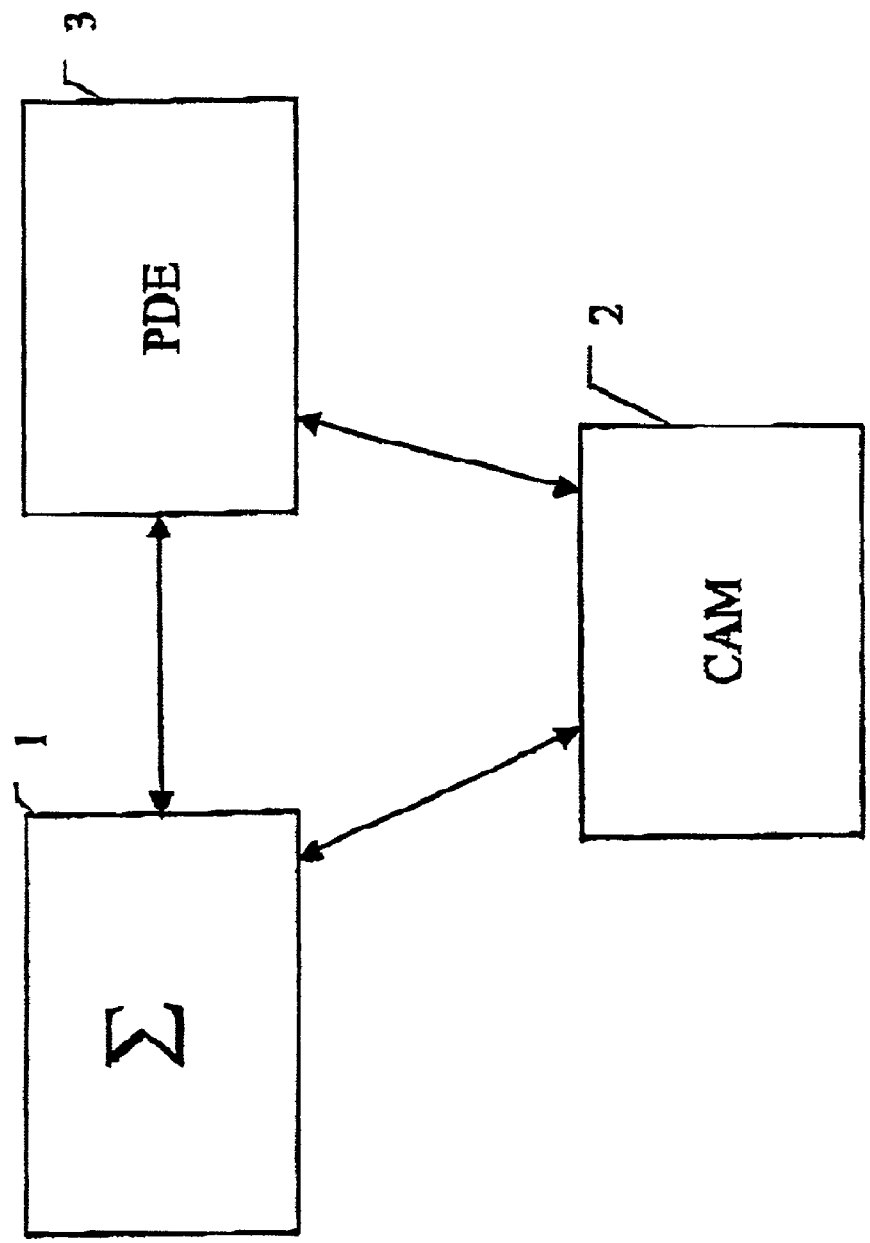

The invention relates to video image compression. In particular, the invention relates to a new and advanced method and system of performing motion estimation in conjunction with video image compression.

PRIOR ART

Previously known are several methods of video image compression. For most of the methods, motion estimation is the stage demanding the most time and computing efficiency. The main principal of motion estimation is as follows. A video image consists of successive frames in a time level. Each frame is divided into image blocks of certain size. Typically a block is, e.g. the size of eight by eight pixels. When coding a frame, e.g. for transmission it is being processed block by block. However, instead of transmitting each frame as such, an attempt is made to search from the previous frame, in the area of the image block being worked, in so called search area, a block either exactly matching with or in a certain scope close to the current block. In case this kind of image block is found, just the motion vector, i.e. vector denoting the location of the found block in relation to the original one is transmitted instead of transmitting the whole block of information. The amount of the information to be sent is thereby remarkably reducing.

One other method used in conjunction with video compression is vector quantization. It differs from motion estimation in that the matching tag for the block to be coded is searched from a predetermined code book, instead of searching it from the previous frame. The code book is typically a group of most commonly appearing image blocks. The same code book is naturally used both for the encoders and decoders.

Although using motion estimation and vector quantization remarkably helps to reduce the amount of the information to be transmitted, there are, however, certain problems associated with them. Typically, especially the search phase is time-consuming. The complexity of search increases in relation to the square of the page length of the search area. Therefore, attempts have been made to develop different methods using which the search may be made fastener. The following publications disclose examples of methods with the intent to fasten motion estimation and vector quantization either by focusing on enhancing the search algorithms or using some other means: S. T. Valli, "Very Low Bitrate Coding Using Hierarchical Classified VQ and Cluster Based Segmentation of Motion Information", paper No. 7.3, VLBV94, University of Essex, UK, April 1994; H. Li, A. Lundmark, R. Forchheimer, "Image Sequence Coding at Very Low Bitrates: A Review", IEEE Transactions on Image Processing, Vol. 3, No. 5, September 1994; H. Abut, ed., "Vector Quantization", IEEE Press, 1990; G. Poggi, "Fast Algorithm for Full-Search VQ Encoding", Electronic Letters, Vol. 29, No. 123, June 1993; C. -M. Huang, Q. Bi, G. S. Stiles, R. W. Harris, "Fast Full Search Equivalent Encoding Algorithms for Image Compression Using Vector Quantization", IEEE Transactions on Image Processing, Vol. 1, No. 3, July 1992.

When using the present methods the search area is at maximum typically ±15 pixels of the point of origin of the block to be coded. And even in that case the search is so complex that carrying out it via software is generally speaking not even possible, instead expensive device-based solutions have to be used, such as specific signal processing circuits. However, shifts even bigger than the ±15 pixels mentioned in conjunction with the applications of low transfer rate/low image frequency are common during the motion. Thus, there is a need for more efficient methods.

The objective of the present invention is to disclose a method and system that would eliminate the drawbacks mentioned above. One specific objective of the invention is to disclose a method and system that makes it possible to perform motion estimation in a regular PC environment and at the same time more efficiently than before.

SUMMARY OF THE INVENTION

The method of the present invention for performing motion estimation in video image compression comprises the following stages. On frame N, an image block that is wished to be coded is determined. On frame N-1 prior to the aforementioned frame N, a search area of motion vectors corresponding to the location of the block in question is determined. The image block average values are determined in every possible location area of the image blocks included in the aforementioned search area using a shift of predetermined size. After this, based on the image block average values of the image blocks, the image blocks included in the aforementioned search area are arranged in a predetermined order. Previously known is a method of performing the aforementioned arrangement by using different sorting algorithms. The disadvantage associated with the algorithms in question is, however, their slowness. Next, an alternative best matching with the image block to be coded is searched among the image blocks of the search area in question. The maximum correspondence may be determined, e.g. using a minimum error, i.e. the blocks with the smallest error between them and best matching with each other.

The determining of the image block average values is used herein to mean that in a preferred case, the image block average values computed and stored already in connection with the coding of the previous image blocks are retrieved from a specific image block average value memory. This is possible because the search area determined for the image block to be coded is typically partly the same as the search area corresponding to the previous coded image blocks for which the determining of image block average values and storing in the memory in question has already happened. If however, motion estimation is not used in coding the previous image blocks or if the image block average value cannot be found in the aforementioned memory, so the image block average value is computed and stored in the memory in question.

In the advantageous procedure presented above the image block average values of frame N-1 are computed and stored as the image blocks of frame N are being coded. The image block average values may, however, be computed and stored in one go before coding the image blocks. This is, however, not preferable because motion estimation requiring computing of the image block average values is not necessarily performed in coding every image block.

In accordance with the invention, the image blocks included in the search area are sorted by storing the image block average values of the image blocks in question in the memory locations of the directory memory of an associative memory device in an ascending or descending order and by storing in the memory location of the output memory corresponding to each memory location of the directory memory the location data of the image blocks whose image block average value corresponds to the value stored in the memory location of the directory memory in question. As a key word of the aforementioned associative memory device, the image block average value of the image block to be coded is used.

An associative memory device is used herein to mean a digital memory device, such as, e.g. a memory chip in which the regular address coding logic has been substituted with a specific directory memory. The directory memory consists of memory locations with, e.g. a certain character string stored in each one of them. In addition, the associative memory device includes output memory in the memory locations of which the actual data is typically stored. Each one of the memory locations of the output memory is associated with one or more memory locations of the directory memory. A certain key word, which might be, e.g. a character string, is given to the memory to serve as an input. In case a matching tag with the key word is found in some memory location of the directory memory, as output is received the content of the memory location of the output memory corresponding to the memory location of the directory memory in question. An example of an associative memory device is CAM (Content Addressable Memory, CAM). A more detailed description of an associative memory device can be found, e.g. in the publication T. Kohonen, "Self-Organization and Associative Memory", Springer-Verlag, 1984.

Further in accordance with the invention, the group of the image blocks to be processed is restricted on the basis of a mean error in accordance with the following equation:

$Y_A = \{y_i : |\xi_x - \xi_i| \leq D_{min}\}$, in which $Y_A$ represents the restricted group of the image blocks to be processed, $y_i$ is the candidate block i, $\xi_x$ is the image block average value of the image block to be coded.

$\xi_i$ is the image block average value of the candidate block i, and $D_{min}$ is the error of the best candidate block per each pixel.

$D_{min}$ may be computed, e.g. as an RMS error or as a MAD error (Root-Mean-Squared, RMS; Mean-Absolute-Distortion, MAD). A more detailed description of restriction on the basis of mean error can be found, e.g. in the aforementioned publications C. -M. Huang, Q. Bi, G. S. Stiles, R. W. Harris, "Fast Full Search Equivalent Encoding Algorithms for Image Compression Using Vector Quantization", IEEE Transactions on Image Processing, Vol. 1, No. 3, July 1992 and G. Poggi, "Fast Algorithm for Full-Search VQ Encoding", Electronic Letters, Vol. 29, No. 123, June 1993.

Furthermore in accordance with the invention, the best match is searched among the blocks included in the restricted group of images in question by using the PDE method (Partial Distance Elimination, PDE). PDE is a method known in itself, which is used, e.g. in vector quantization for fastening the search. The error between the image block to be coded and the candidate block is computed normally pixel by pixel. If the error exceeds the minimum error up to that stage, the computing is stopped and the comparison is done in the next candidate block.

In an embodiment of the invention, a predetermined area of regular shape around the image block to be coded is used as search area. The search area is typically, e.g. the shape of a quadrangle.

In an embodiment of the invention, an area is defined that is comprised of an area of one or more objects moving fast between successive image frames, and the said area is used as search area.

In an embodiment of the invention, the possible location areas are defined by using a shift of one pixel, a half of a pixel or some other fractional shift.

The advantage of the present invention when compared with the prior art is that it remarkably fastens motion estimation and thereby makes it possible to perform motion estimation via software in a regular PC environment and still more efficiently than before. Since motion estimation may be performed via software, there is no need for expensive device-based solutions, and therefore, by the aid of the invention, motion estimation may be made more advantageous than before.

LIST OF FIGURES

In the following section, the invention is described by way of examples of its embodiments with reference to the attached drawing, wherein FIG. 1 represents a system of the invention described in a block diagram.

DETAILED DESCRIPTION OF THE INVENTION

FIG. 1 represents the components of a system of the invention. The system has been implemented, e.g. in a form of programmable components in a regular PC device. The system comprises means of determining 1 using which the image block average values are determined in the location areas of the image blocks included in the search area corresponding to the location of the image block to be coded, means of sorting 2 using which the image blocks are sorted on the basis of their image block average values, and means of searching 3 using which an alternative best matching with the image block to be coded is searched among the image blocks. The means of determining 1 comprise an image block average value memory (not presented), wherein the computed image block average values are stored and where they are retrieved from in case needed. In practice, the image block average value memory may be, e.g. a certain part of the memory space of a PC device.

In accordance with the invention, the system comprises a CAM memory 2 by means of which the image blocks are sorted by storing their image block average values in the memory locations of the directory memory in an ascending or descending order and by storing in the memory location of the output memory corresponding to each memory location of the directory memory the location data of the image blocks whose image block average value corresponds to the value stored in the memory location of the directory memory in question. In practice, the CAM memory 2 is advantageously a certain part of the memory space of a PC device, but it may be, e.g. a separate memory chip. Further in accordance with the invention, the system comprises means 3 for restricting the group of the image blocks to be coded on the basis of a mean error, and means 3 for searching among the image blocks included in the restricted group of images the best match by using the PDE method.

On frame N, an image block that is wished to be coded is determined. On frame N-1 prior to the aforementioned frame N, a search area of motion vectors corresponding to the location of the block in question is determined. The image block average values are determined in every possible location area of the image blocks included in the aforementioned search area using a shift of predetermined size, such as a shift of one pixel, a half of a pixel or some other fractional shift. After this, the image blocks in question are arranged in a predetermined order on the basis of their image block average values and an alternative best matching with the image block to be coded is searched among the image blocks of the search area in question. The maximum correspondence may be determined, e.g. using a minimum error, i.e. the blocks with the smallest error between them are best matching with each other.

In practice, the determining of image block average values happens by retrieving the image block average values computed and stored already in connection with the coding of the previous image blocks from a specific image block average value memory. This is possible because the search area determined for the image block to be coded is typically partly the same as the search area corresponding to the previous coded image blocks for which the determining of image block average values and storing in the memory in question has already happened. If however, motion estimation is not used in coding the previous image blocks or if the image block average value cannot be found in the aforementioned memory for some reason or other, so the image block average value is computed and stored in the memory in question.

In the advantageous procedure presented above the image block average values of frame N-1 are computed and stored as the image blocks of frame N are being coded. The image block average values may, however, be computed and stored in one go before coding the image blocks. This is, however, not preferable because motion estimation requiring computing of the image block average values is not necessarily performed in coding every image block.

In accordance with the invention, the image blocks are sorted by storing their image block average values in the memory locations of the directory memory of the CAM memory 2 in an ascending or descending order. Further, the location data of the image blocks whose image block average value corresponds to the value stored in the memory location of the directory memory in question is stored in the memory location of the output memory corresponding to each memory location of the directory memory. As a key word of the CAM memory 2, the image block average value of the image block to be coded is used. As search area, a predetermined area of regular shape around the image block to be coded is used. The search area is, e.g. the shape of a quadrangle. Alternatively, the search area may be an area comprised of an area formed by one or more objects moving fast between successive frames.

The invention is not restricted to the examples of its embodiments presented above, instead many variations are possible within the scope of the inventive idea defined by the claims. One such variation is the using of the present invention for the searching of matching image blocks between the images of a pair of stereo images (the left-hand and right-hand image). This procedure similar to motion estimation is described, e.g. in the publication I. Dinstein et al., "On the Compression of Stereo Images: Preliminary Results", Signal Processing 17 (1989), s. 373–382.

The invention claimed is:

1. A method for performing motion estimation of image blocks on image frames in video image compression using an associative memory device including a directory memory having memory locations and an output memory including a plurality of memory locations, each of the plurality of memory locations of the output memory corresponding to at least one memory location of the directory memory, wherein the method comprises:

a) determining a location of an image block to be coded on a current frame;

b) determining a search area on a previous frame corresponding to the location of the image block on the current frame, the search area including a plurality of image blocks, each of the plurality of image blocks having a location on the previous frame;

c) determining image block average values for the locations of the plurality of image blocks included in the search area by using a shift of predetermined size;

d) determining an image block average value for the image block to be coded;

e) restricting the image block average values determined for the locations of the plurality of image blocks included in the search area to include only the image block average values which differ from the image block average value determined for the image block to be coded no more than a predetermined maximum error;

f) storing the restricted image block average values of the plurality of image blocks in the memory locations of the directory memory of the associative memory device in an ascending or descending order;

g) storing in the memory locations of the output memory corresponding to each memory location of the directory memory the locations of each image block included in the search area and having an image block average value corresponding to the image block average value stored in the memory location of the directory memory;

h) entering the determined image block average value of the image block to be coded as a key word for the associative memory device;

i) outputting, from the corresponding memory locations of the output memory of the associative memory device, a restricted group of locations of the image blocks included in the search area;

j) calculating an error between the image block to be coded and each image block included in the search area corresponding to the restricted group of locations of the image blocks, wherein a partial distance elimination method is used for fastening the error calculation, and wherein the error calculation is started with the locations of the image blocks in which the corresponding image block average value stored in the memory location of the directory memory best matches the entered key word;

k) storing a minimum one of the calculated errors and the location of the corresponding image block;

l) repeating steps c)–k) for all the locations of the image blocks included in the restricted group of locations of the image blocks with the minimum one of the calculated errors stored in step k) used to replace the subsequent maximum error of step c) each time; and m) outputting the location and the error of the image block in the search area best matching the image block to be coded, the error thus being the minimum error within all image blocks in the search area, thereby performing motion estimation for the image block.

2. Method as defined in claim 1, wherein:

a predetermined area of regular shape around the image block to be coded is used as the search area.

3. Method as defined in claim 1, further comprising:
defining an area comprised of one or more objects moving quickly between successive image frames,
and using the area as the search area.

4. Method as defined in claim 1, further comprising:
determining possible location areas of the image blocks by using a shift of one pixel, a half of a pixel or other fractional shift.

5. A system for performing motion estimation of image blocks from a first image frame to a second image frame in video image compression, the first image frame including a search area having a plurality of image blocks and the second image frame including an image block to be coded, wherein the system comprises:

means of determining image block average values of locations of the image blocks included in the search area corresponding to a location of the image block to be coded by using a predetermined shift on the first image frame, said means of determining further configured to determine an image block average value for the image block to be coded;

means of restricting the image block average values determined for the locations of the plurality of image blocks included in the search area to include only the image block average values which differ from the image block average value determined for the image block to be coded by no more than a predetermined maximum error;

an associative memory device including a directory memory having memory locations and an output memory including memory locations corresponding with at least one memory location of the directory memory, the directory memory storing the image block average values of the image blocks included in the search area in an ascending or descending order and the output memory storing the locations of the image blocks, each memory location of the output memory storing the location of each image block included in the search area having an image block average value corresponding with the image block average value stored in the corresponding memory location of the directory memory, and wherein the determined image block average value of the image block to be coded is entered as a key word of the associative memory device, said associative memory device further configured to output from the corresponding memory locations of the output memory of the associative memory device a restricted group of locations of the image blocks included in the search area;

means of searching for a various best matching image block by calculating an error between the image block to be coded and each image block included in the search area corresponding to the restricted group of locations of the image blocks, wherein a partial distance elimination method is used for fastening the error calculation, and wherein the error calculation is started with the locations of the image blocks in which the corresponding image block average value stored in the memory location of the directory memory best matches the entered key word;

wherein said associative memory device is further configured to store a minimum one of the calculated errors and the location of the corresponding image block;

wherein of the means of restricting, the associative memory, and the means of searching are further configured to repeat their respective operation for all the locations of the image blocks included in the restricted group of locations of the image blocks with the minimum one of the calculated errors used to replace the predetermined maximum error each time; and wherein said associative memory device is further configured to output the location and the error of the image block in the search area best matching the image block to be coded, the error thus being the minimum error within all image blocks in the search area.

* * * * *